Oct. 7, 1941.  J. F. JAROS  2,257,881
LIGHT PROJECTOR
Filed June 3, 1937  4 Sheets-Sheet 2
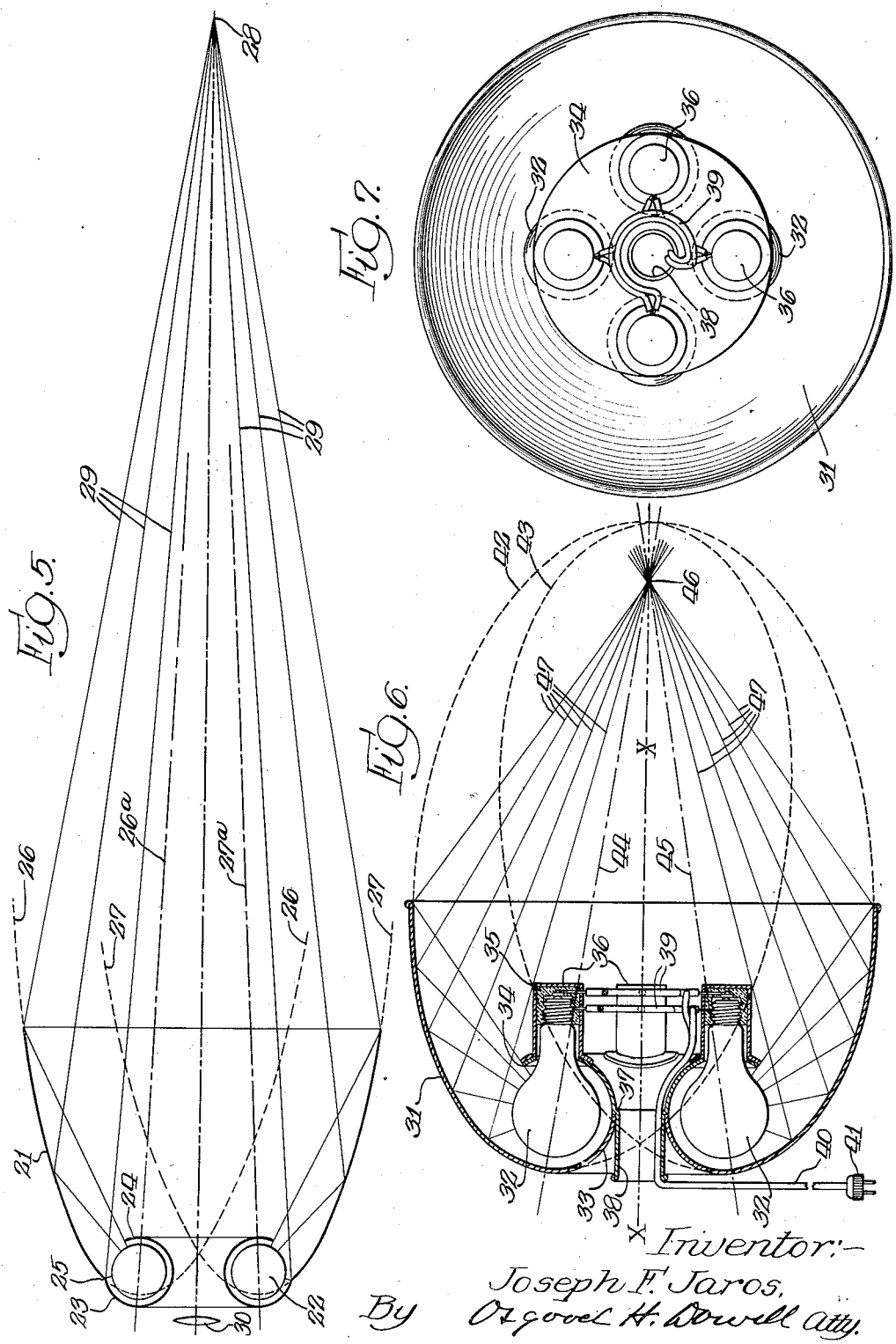
Inventor:—
Joseph F. Jaros,
By Osgood H. Dowell atty.

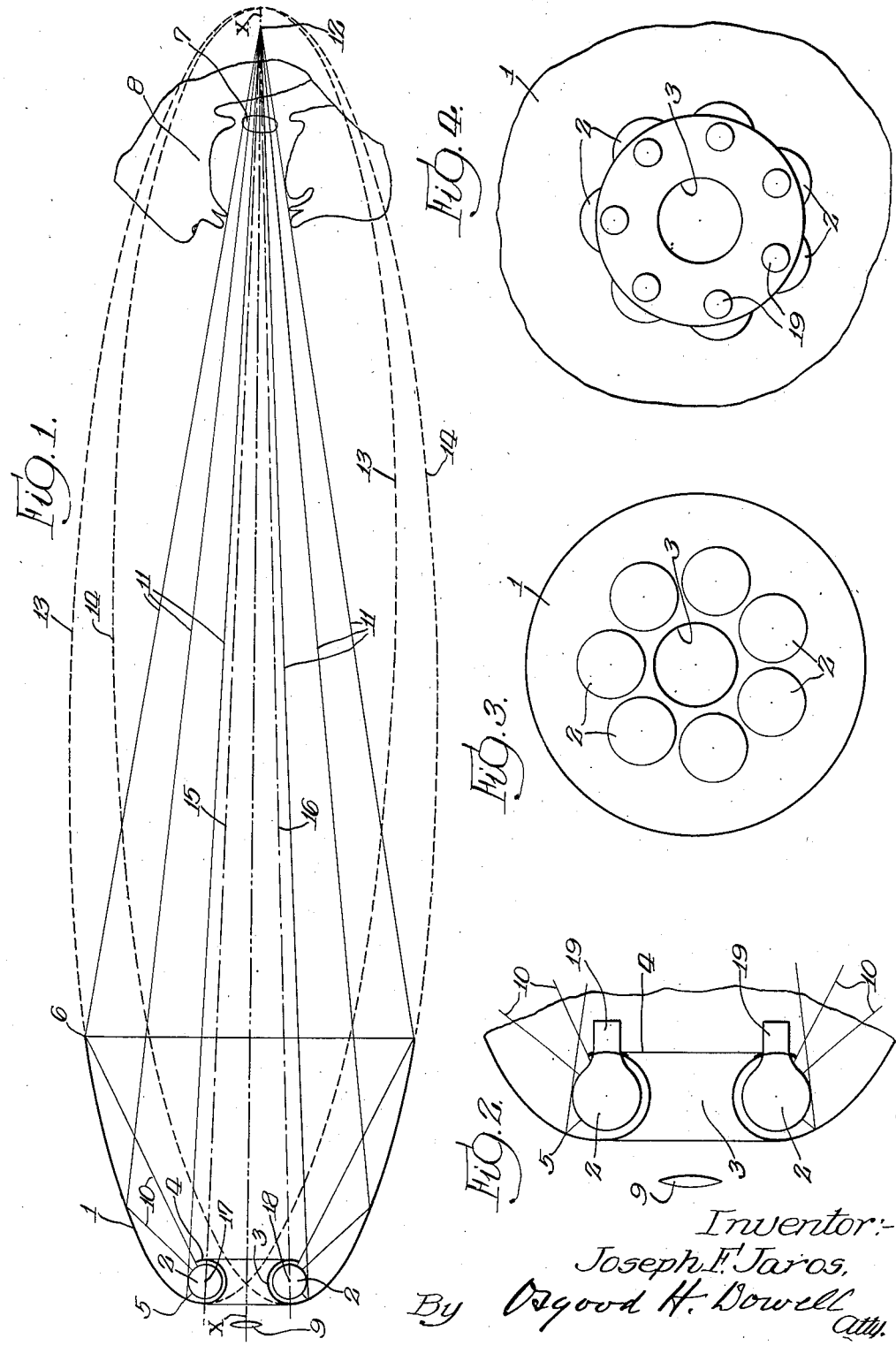

Oct. 7, 1941.  J. F. JAROS  2,257,881
LIGHT PROJECTOR
Filed June 3, 1937  4 Sheets-Sheet 3
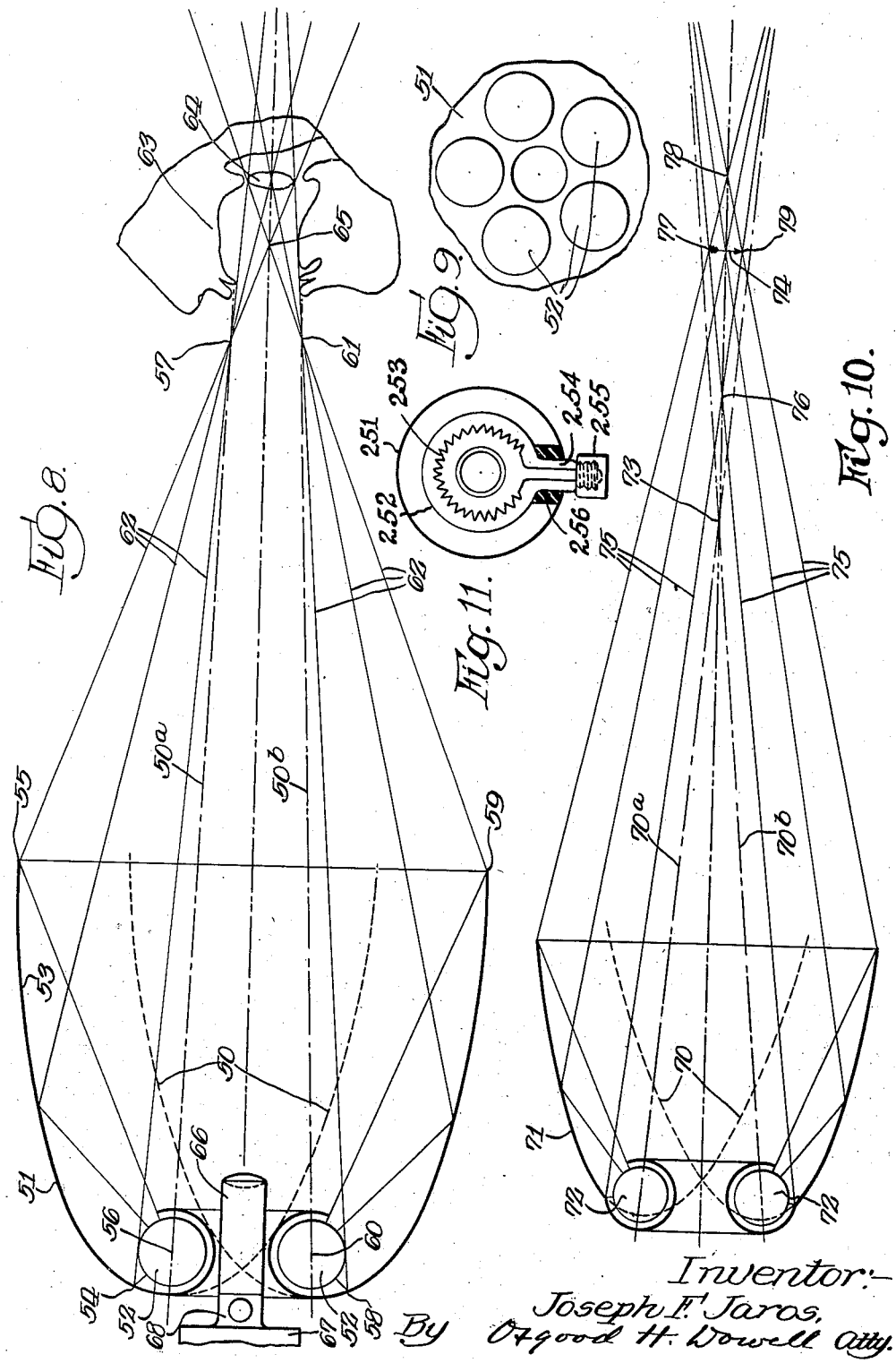
Inventor:—
Joseph F. Jaros,
By Osgood H. Dowell Atty.

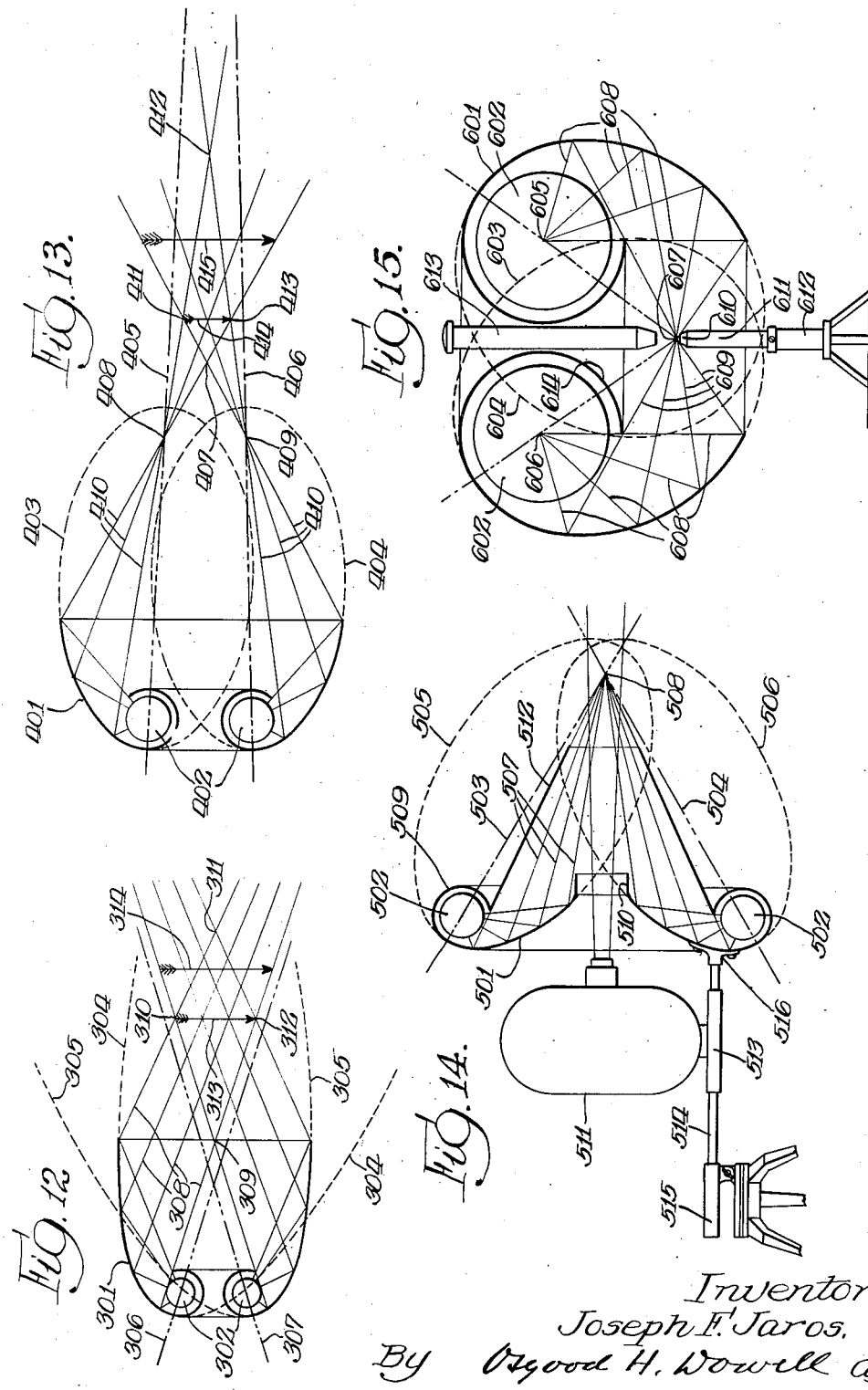

Patented Oct. 7, 1941

2,257,881

UNITED STATES PATENT OFFICE 2,257,881

LIGHT PROJECTOR

Joseph F. Jaros, Riverside, Ill.

Application June 3, 1937, Serial No. 146,181

4 Claims. (Cl. 240—1)

This invention relates to light projectors, including especially projectors through which an object illuminated by the projected light can be viewed or exposed for photography, and to combinations with cameras and optical instruments of light projecting means for the purposes of object illumination.

Objects of the invention, among others, are to provide a practicable and serviceable light projector, utilizing a plurality of lamps or an annular lamp, for the purposes an object illumination; to provide improved means for producing concentrated light from a plurality of sources; to provide a type of light projector susceptible of many embodiments and useful applications, including uses for purposes of object illumination under conditions or in situations in which ordinary illuminating equipment of comparable light power could not be successfully employed, or for purposes for which such ordinary illuminating equipment would not be practicable; to provide practicable means for successfully accomplishing satisfactory object illumination under difficult requirements, as for instance the illumination of a part within an anatomical cavity under the conditions required for medical examination or photography; to provide a light projector for producing spot illumination or a concentration of object illuminating light rays while affording an unobstructed optical passage therethrough, so that the object illuminated can be viewed behind the projector or exposed in the field of a camera or of the lens of an optical instrument placed behind the projector or squarely in front of the illuminated object; to provide highly useful devices, in the form of light projectors of the character referred to, for use as instruments for examining parts of the human body or for scientific or critical examination of materials and small objects, or for other special purposes; and to provide an improved manner and means of object illumination for photography, having in view more especially, though not exclusively, the photographing of small objects, parts of the human body and interiors of or parts within anatomical cavities and the taking of colored motion pictures of surgical operations performed within anatomical cavities and incisions.

The nature of the invention will be best understood by reference to illustrative embodiments shown in the accompanying drawings.

In said drawings:

Fig. 1 is a diagram including one form of light projector embodying the invention, the representation of the light projector being a diagrammatic longitudinal sectional view, taken on a diametric plane.

Figs. 2, 3, and 4 are views on a larger scale of parts embodied in the light projector of Fig. 1; Fig. 2 being a sectional view of the central portion of the projector; Fig. 3 is a cross-section taken through the lamps; and Fig. 4 a front elevation of the central portion of the projector.

Fig. 5 is a diagrammatic longitudinal sectional view of a light projector generally similar to that first shown but having its central portion constructed to accommodate lamps of a relatively large size for a given size of light projector of this particular design or pattern.

Fig. 6 is a longitudinal sectional view, taken on a diametric plane, of a light projector of the same type as that first shown but designed to accommodate relatively large lamps and to bring the point of concentration of reflected light much closer to the lamps and to the central vision opening than in the preceding figures.

Fig. 7 is a front elevation of the light projector shown in Fig. 6.

Fig. 8 is a diagrammatic sectional view of a light projector similar in type to that shown in Fig. 1 but designed to reflect light from different points about the axis to a ring of nodes or intersections of light rays, with the effect of producing a narrow shaft of concentrated light relatively closer to the lamps and central vision opening than in Fig. 1.

Fig. 9 is a diagrammatic cross section on a reduced scale through the lamps shown in Fig. 8.

Fig. 10 is a diagrammatic sectional view of the type of light projector shown in Figs. 1 and 5, designed to superimpose reflected light from different source points around the axis of the projector upon a restricted objective area.

Fig. 11 represents an annular lamp.

Figs. 12 and 13 are diagrammatic sectional views of other projectors embodying the invention.

Fig. 14 is a similar view of another form of projector embodying subject matter within the scope of the invention.

Fig. 15 is a similar view of an embodiment of the invention for use with microscopes.

Referring to Figs. 1 to 4, the line $x$—$x$ is the axis of an annular light reflector, designated by the numeral 1. Mounted in this reflector is an annulus of light source means, represented by a series of incandescent electric lamps or light bulbs 2 arranged at intervals around the axis of the reflector. As hereinafter explained, the reflector is formed to focus light reflected in radial planes from individual lamps, and to concentrate the light so reflected from the several lamps. Instead of an annulus of individual lamps, a single annular lamp may be employed, as for example a mercury vapor lamp having its luminous gas tube constructed as an annulus or near annulus, or an incandescent lamp in a similar form, one suggested construction for which is represented in Fig. 11. However it is desirable to utilize individual light bulbs such as are now commercially available for photographic and other special illuminating purposes, and the invention contemplates the use of such light bulbs, preferably in a sufficient number and close spacing to provide a substantial annulus of light source means, though in the broader aspects of the invention a lesser number may be employed, and such lesser number are intended to be employed in some cases. Light from the several source points represented by these light bulbs, incident on the reflector in radial planes, will be reflected convergingly to a forwardly situated focus or focal region on the axis of the reflector, as diagrammatically represented in Fig. 1.

The reflector 1 in the particular form shown, consists of an ovoidal shell having an interior light reflecting surface. Bowl-shaped or saucer-like in its rear portion, tubular in its extended portion, and cup-like as a whole, this shell exemplifies a reflector embodying each of these several forms. The rear end of the shell, at its central portion, is formed to curl through and partially around the annular series of lamps, making a tubular protuberance 3, which provides an axial vision opening or optical passage, through which an object illuminated in the field of concentrated light cast by the reflector can be viewed or photographed from a position behind the reflector. Said tubular protrusion is provided with an expanding or flaring extension which forms an annular light shield 4 in front of the lamps, protecting the vision opening and the space in front of the lamps from glare or direct light. This light shield is preferably of sufficient diameter to prevent passage from the reflector of direct light rays parallel with the reflector axis. Thus the reflector structure will intercept direct light other than that which passes forwardly around the light shield in directions diverging outwardly from lines parallel with the axis; and it may be designed to intercept all direct light. The reflector of Fig. 1 is so designed. The central portion of the reflector in which the lamps are housed forms an annular channel opening outwardly and facing the surrounding reflecting surface of the reflector. This channel which is interiorly light reflecting may be of semi-circular cross-section, thus providing a toric light reflecting surface which will reflect direct light incident thereon reversely to the surface from which incident light is reflected beyond the reflector. Such last mentioned surface, in the particular instance shown in Fig. 1, extends from the point 5 to the end 6 of the reflector shell, and may be further extended by increasing the length of the shell, with accompanying reduction of the diameter of the light shield 4.

An object illuminated by concentrated light cast by the reflector is indicated at 7, such object in this instance being represented by a throat tonsil. A portion of the anatomy of the head defining the mouth cavity is diagrammatically shown at 8. The tonsils are located at the back of the mouth cavity, about three inches from the mouth opening. While it is possible to obtain an opening of the mouth for about or nearly two inches, and by the use of a palate-like instrument to depress the tongue, so as to provide an unobstructed optical passage obliquely through the mouth to one of the tonsils, yet it is exceedingly difficult to obtain proper and sufficient illumination of a throat tonsil for the purpose of medical inspection or photography, under the conditions required for exposure of the tonsil to the eye or the lens of a camera. The particular form of light projector shown in Fig. 1 is designed to accomplish this by projecting a slender tapering shaft of reflected light rays which can enter the mouth and fall upon the tonsil area, the light rays being projected at such slight angles to the axis of the reflector that much of the light falling upon the tonsil will be reflected back toward the eye or the lens of the camera. Such eye or lens is indicated at 9, which may represent either the human eye or the eye of a camera or lens of a telescope or other optical instrument through which the illuminated object is to be viewed or its image is to be rearwardly projected.

In Figs. 1 and 2 a few of the multitude of light rays which radiate from light bulbs 2 in the diametric plane of the drawing are indicated at 10, and the reflected rays at 11, such reflected rays in this instance converging to a focus 12 on the axis of the reflector. Assuming reflection of light in the manner indicated in many radial planes, i. e. planes radiating from the axis of the reflector, it will be apparent that the reflector will cast a tapering shaft of reflected light of annular cross-section, gradually decreasing in both internal and external diameter, whereby a small objective area placed at or near the focus 12, either fore or aft, but preferably before, will be highly illuminated by light reflected from a multiple of source points around the axis of the reflector and distributed around said axis on said area.

A contour line for the reflector, suitable for the purpose of the invention, may be determined in a practical way by the use of a strip of sheet aluminum having an attached light bulb. The end of the aluminum strip to which the light bulb is attached is first bent into a semi-circular form corresponding to the central lamp housing portion of the reflector, so that the light bulb will be in the same position in relation thereto that it will have in the reflector. The aluminum strip, being soft and pliable, can be manipulated or molded by hand until it forms such a curve that light from the bulb shining thereon along substantially its entire length or at least the principal portion of its length will be reflected into the eye of a person standing at a fixed position, to whom the entire length of the strip will appear ablaze with blinding light; or in a dark room the manipulator may mold the strip while pointing it toward a mirror until he observes a convergence of light rays from along substantially the entire length of the strip to a point. Then in a dark room the aluminum strip of the curvature thus obtained can be placed alongside a dark background marked with a white line to indicate the axis of the reflector, the strip being placed so that the lamp is disposed laterally of such axis and the body of converging light rays reflected from the strip will point toward the axis. The curve thus obtained, in proper relation to the axis, may be adopted as the contour line for the reflector, whose reflecting surface will then be that described by revolution about its axis $x$—$x$ of the said curve in the aforesaid relation to said axis.

The curve obtained in the manner just described will conform substantially or principally to a segment or arc of an ellipse. One of the properties of an ellipse is that a line tangent thereto at any point will make equal angles with the lines connecting such point with the foci of the ellipse. Hence light radiating from a source at one of the foci of an elliptical reflector will be reflected to its other focus. This principle is utilized for the purposes of the present invention by providing sources of light arranged on an imaginary circle, in combination with a reflecting surface which is that described by revolution about the axis of such circle of a segment of an ellipse having one of its foci on said imaginary circle and its other focus at a forwardly situated point. Such a reflecting surface, distinctly different from an ellipsoidal surface described by rotating an ellipse on its own major axis, may for convenience be termed hyper-ellipsoidal. The intersections of radial planes with the reflector of Fig. 1 will define corresponding segments of different similar ellipses arranged on converging major axes. Thus in Fig. 1 the diametric plane of the drawings intersect the reflector along lines including segments of two imaginary intersecting ellipses 13 and 14 arranged on converging major axes 15 and 16 and whose rear foci are proximate to the rear end of the reflector at the points 17 and 18. The forward foci of such ellipses may be nearer the axis of revolution, or substantially on said axis, or at the opposite side of said axis, depending upon the point at which the major axes of the ellipse cross or intersect the axis of revolution. In the arrangement shown in Fig. 1, which for some purposes is considered preferable to other arrangements presently to be described, the major axes of these imaginary ellipses cross at or approximately at their front foci, which are thus substantially or approximately coincident at the point 12 on the axis of the reflector.

Assuming a multiple of light source points arranged around the axis of the reflector on the aforesaid imaginary circle of rearward foci of the imaginary ellipses whose segments are embodied in the hyper-ellipsoidal reflecting surface, light therefrom incident on the reflector in radial planes, i. e. planes radiating from the axis of the reflector, will be converged to a focus represented by the point 12, and additional light incident on the reflector in planes closely adjacent and only slightly oblique to such radial planes will be reflected to foci about the point 12 or so as to pass in proximity thereto. Actually conditions differ from theoretical, in that the light source points around the axis are represented by light bulbs positioned with their centers of luminosity approximately on said circle. I assume that much of the light from each bulb is reflected to a focus partaking of the shape and size of a portion of the bulb, these different foci of reflection being conglomerated about the point 12. However this statement is speculative and I do not wish to be bound by it or by any theory of operation, but to rely only upon the proposition that a light projector constructed in accordance with the principles herein set forth, having the contour line of its reflector determined from an aluminum strip and attached bulb in the manner hereinbefore explained, or constructed from a drawing or layout in accordance with the scheme exemplified in Fig. 1, will produce a discharge of light highly advantageous for many object illuminating purposes, giving a concentration of light rays centered about the axis of the reflector at the focus 12. It is advantageous to place the lamps near the axis of the reflector, since if placed fairly close to the axis, as in the drawings, a large amount of light radiating from the lamps in adjacent planes of slight obliquity to the radial planes will be so reflected that the rays will pass in proximity to the point 12. Inasmuch as the lamps are necessarily offset from the axis of the reflector, of course much of the light incident on the reflector will be reflected in a more or less scattering fashion, and it is not intended to imply that the reflected light as a whole will be converged in the manner diagrammatically represented in Fig. 1. On the contrary the reflected light as a whole will be useful for general object illumination, giving the much desired effect of a brilliant center and surrounding field of diminishing illumination. But a sufficiently large amount of the light will be reflected to a focus or focal region represented by the point 12 to be specially useful in the photography of small objects and interior of anatomical cavities.

A small objective area at or near the focus, either fore or aft, will be highly illuminated by the concentrated light distributed upon such area around the axis. Broadly speaking, light radiating from the several sources will be reflected largely in such a manner as to illuminate different sectors or parts of the objective area, and the illumination may be such as to cover substantially the entire area if there are enough light sources, for instance five or more. The fact that much of the direct light other than that which is incident upon the reflector surface in radial planes will be reflected variously around rather than to the focus 7 is of advantage in this connection, as the general effect is to give an even distribution of light upon the object to be illuminated and to avoid a dark center. Even with the use of three or four lamps in the projector there is an approach to this general effect, which is more and more realized as the number and close spacing of the sources of light increase, and may be realized to the ultimate extent by the use of an annular lamp or such an annular series of light source means as to provide substantially an annulus of source light, giving reflection in the manner heretofore described in an infinity of radial planes around the axis.

One of the valuable uses, among other valuable uses, of an illuminator embodying the present invention is for the purpose of taking pictures, including especially colored motion pictures, of surgical operations in anatomical cavities and incisions. It is highly desirable, for example, to supply colored motion pictures of operations for removal of enlarged throat tonsils by electrical extirpy or the so-called coagulation method. As this method of removal of tonsils is comparatively modern, it becomes important to display motion pictures of such operations for instruction of the medical profession and of medical students. In the use of an illuminator of the character described in combination with a suitable motion picture taking machine for this purpose, there are many advantages over efforts previously made to attain illumination of parts within anatomical cavities by casting light from high power lamps and large individual reflectors upon the face of the patient. Not only is there more effective utilization of lamps but also a better illumination of the part exposed in the field of the camera lens under the conditions required for such exposure. Better illumination within the cavity is obtainable from a given number of lamps than could be obtained from the same number of lamps of equal light power, or even from a greater number of such lamps with the use of ordinary reflecting equipment; and a proper and sufficient illumination of a part within an anatomical cavity, or of an operation conducted therein, can be obtained with the use of less light power than would be obtainable by ordinary methods.

Fig. 1 may be considered an approximately or nearly full size representation of a small illuminating scopical instrument to be held to the eye for medical examination of parts of the human body, or for other scopical purposes, or it may be considered to be a representation on a small scale of a larger illuminator for use in combination with a camera or a motion picture taking machine. Assuming the illuminator for use for the camera to be from four to six times larger than that shown in Fig. 1, the illuminated object to be photographed, e. g. the throat tonsil in Fig. 1, will be located at a distance between three and five feet from the camera lens. Under these conditions the camera may be equipped with a telephoto lens of such small angle as to give only a small field area at the distance from the lens at which the object is located, so that at such distance of the object from the lens the image of an objective area only slightly larger than the patient's mouth will fill the picture frame of the camera, i. e. the exposed area of sensitive area or film on which the image of the object is projected through the lens. For critical sharpness of the image, the hyperfocal distance of the lens should be not greater than the distance of the object from the lens, as will be understood by those familiar with the camera art.

In embodiments of the invention employing an annular lamp, the annular center of the annular luminous element of the lamp should conform as nearly as possible to the annular locus established by the reflector, i. e. the imaginary circle of rearward foci of ellipses whose segments are embodied in the hyper-ellipsoidal reflecting surface. In embodiments of the invention utilizing individual light bulbs, it is desirable to employ light bulbs of the spherical type and having their luminous elements accurately constructed and positioned so that their centers of luminosity will be substantially at their centers of sphericity, and these light bulbs should be positioned with their centers substantially on the aforesaid imaginary circle. Clear glass bulbs are considered preferable for lighting purposes, but the invention also contemplates the use of frosted bulbs, especially the excellent "Mazda" photo flood bulbs manufactured by General Electric Company, which give illumination of the proper spectrum for colored photography. The Mazda No. 1 photo flood light bulb is a high power lamp of 750 watts, and the No. 2 bulb of the same type is a still higher power lamp of 1500 watts. Batteries of these powerful lamps used in light projectors embodying the present invention will give enormous light power. Still larger and higher power light bulbs are available, which may be used in projectors for certain purposes; however the invention contemplates in many cases the use of smaller bulbs of lesser power, including in some instances miniature bulbs. The light bulbs may be mounted in the reflector in any appropriate manner, as for instance by extending their stems through apertures in the light shield 4 and screwing them into lamp sockets of Bakelite or other insulating material, which are mounted in casings 19 (Figs. 2 and 4) attached to the fronts of the light shields. This method of mounting the bulbs is shown more clearly in Figs. 6 and 7.

Assuming a light projector of the particular design or pattern shown in Fig. 1 to be constructed large enough to accommodate the large No. 2 photo flood light bulbs which are three inches in diameter, the focus 12 will be located about or more than seven feet from the sources of light, which would give enormous illumination upon the tonsil of the patient assuming the patient to be positioned so that the tonsil would be about at the point 12. Of course the projector shown in Fig. 1 can be variously modified in design. For instance, the slight modification shown in Fig. 5 would permit the use of large lamps at a closer distance to the object to be photographed while by other designs the object could be located still further away, for instance to get concentration of illumination from a battery of large lamps upon a small object placed from ten to eleven feet away from the lamps.

Attention is invited to the fact that a light projector or illuminator of the type described occupies only a comparatively little more space than would be occupied by an ordinary elliptical reflector for a single lamp of the same size as those in the projector. Thus in a compact structure occupying only slightly more space than such ordinary elliptical reflector, a battery of lamps can be used, and this battery can be crowded around the axis of the reflector in a manner which would be impossible to approach with the use of individual reflectors, with the resulting advantage, among others, that the strongest light, i. e. that nearest the lamps, is reflected to the object along lines which make very sharply acute angles to the axis of the reflector, which is approximately coincident with the optical axis therethrough, so that much of the reflected light striking upon the illuminated object will rebound back toward the lens of the camera or other optical instrument with which the device is being used. This gives very much better illumination than can be obtained by the use of ordinary illuminating equipment arranged to cast illumination upon the mouth of a patient, since the light so cast will fall so obliquely that much of it will be intercepted by the patient's cheeks, and that which may enter the mouth will be so oblique as not to strike upon the tonsil, or, if so striking, will rebound in a direction diverging from the optical axis.

One of the advantages in the use of illuminators of the type described, in connection with photography of parts with anatomical cavities, or of small diseased areas on a patient's face or body, or of a mole or other small objects, is that the patient is relieved from the discomfort and even burning in some instances incident to the use of a plurality of high power lamps with ordinary reflectors arranged fairly close to the patient and so as to expose him at close range to the direct light from these lamps, often necessitating bandaging of the patient's eyes with wet cloths, and other protection. Also the surgeon performing an operation under the illumination cast, or during the taking of motion pictures, is relieved from extreme discomfort by too close proximity to high power lamps, and has ample room to work, assuming the projector to be designed to place the area of concentrated illumination eighteen inches or more beyond the end of the reflector shell. As already noted, the projector in the design or pattern shown in Fig. 1, and in numerous other specific drawings, may allow several feet or even up to ten feet or more of distance between the lamps and the field of light concentration.

The emphasis which has been placed upon the advantages of the invention in connection with photography of parts within anatomical cavities and small parts of the body, is not to imply that its utility and advantages are confined to these purposes. The invention is highly useful for these and other analogous purposes, and for many other purposes including general photographic object illumination. Embodiments of the invention, either in the form shown in Fig. 1 or in other forms, may also be used not only for the projection of light through spaces, but also for projection of concentrated light into an instrument or into a secondary reflecting system for the further projection of light, of which an example is shown in Fig. 25 hereinafter described.

Reflectors for embodiments of the invention may be constructed with a separable lamp-carrying center piece, as hereinafter described with reference to Fig. 6. The shell of the reflector can be economically manufactured. It can be spun from sheet aluminum or other sheet metal, or it can be molded from asbestos or heat resisting material or Bakelite or other suitable material and interiorly coated to provide a brilliant light reflecting surface. If desired, the lamps can be equipped with individual small reflectors of the hemispherical type enclosing the inner half portions of the lamps, or such inner half portions of the light bulbs can be silvered to increase the amount of light which will be reflected back through the centers of the light bulbs to the surface of the reflector which is effective for forward projection of light.

In the embodiment of the invention illustrated in Fig. 1, the contour line of the reflector from 5 to 6 is a segment of an ellipse, as heretofore explained; or in other words the entire surface of the reflector which is effective for the projection of light beyond the reflector is a hyper-ellipsoidal surface. The invention, however, may embrace embodiments in which the contour line is only in part an elliptical segment, or in other words cases in which the hyper-ellipsoidal surface includes an annular zone of substantial length but not necessarily the entire length of the effective reflecting surface. Reflectors for the purposes of the invention may also embody combinations of hyper-ellipsoidal surfaces, for instance a succession of surfaces whose contour lines are segments of different ellipses having their rearward foci at the imaginary circle on which the lamps are centered but having their major axes at different inclinations to the axis of the reflector, so that light reflected from different portions of the reflector will be concentrated at different foci or focal regions along the axis.

The principles of this invention may be very extensively applied, the type of illuminator above described being susceptible of many different embodiments in large and small sizes and varying styles and designs, for the purposes of near and distant object illumination. In this connection it will be understood that the proportions and design of the illuminator will be varied to suit different requirements and conditions, involving the use of different sizes and types of light bulbs or light source means, the juxtaposition of the light source means at different distances from the axis of the reflector, and the designing of the reflector in accordance with ellipses of varying proportions. According to requirements the reflectors may be of relatively large or relatively small diameter, squat or slender, with the foci of the ellipses whose segments are embodied in the reflecting surface at various distances apart.

Reference will now be made to certain variations from the specific design shown in Fig. 1. The other illustrative light projectors about to be described are similar in general principle to that of Fig. 1 in that each of said projectors comprises an annular light reflector having a hyper-ellipsoidal surface, and a plurality of lamps arranged around its axis, the lamps being positioned on the imaginary circle of foci of imaginary ellipses whose segments are embodied in the reflector, the other foci of such imaginary ellipses being disposed forwardly at such position or positions that the light reflected in radial planes from the several lamps is converged toward the axis. Each of the illustrative projectors is constructed to provide a central vision opening, and with its lamp housing portion to shield the vision opening from direct light.

Fig. 5 shows a construction generally similar to that already described but designed to accommodate lamps of a relatively larger size for a given size of reflector. In Fig. 5 the reflector is designated by the numeral 21 and the lamps by the numeral 22. The shell of the reflector is constructed at its rear end with an annular lamp housing 23, affording a central vision passage and an annular light shield 24. In this case the contour line of the reflector from 25 to the end of the shell is an elliptical segment, this contour line being of the same curvature as that of Fig. 1 but in a different relation to the axis of the reflector. In the diametric plane shown in the drawing, the reflector embodies segments of imaginary intersecting ellipses 26 and 27 having major axes 26a and 27a and their rearward foci at the centers of lamps 22 and their forward foci substantially or approximately coincident at or about the focus 28 of reflected light rays 29. It will be observed that the major lengths of these imaginary ellipses are sufficient to include in the ellipses the centers of the lamps, but not enough to allow the whole lamps to be placed within the ellipses. Thus relatively larger lamps for a given design of reflector can be employed than if the central portion of the reflector were constructed in accordance with the design of Fig. 1. The lens of the camera or optical instrument is indicated at 30. The lamp housing 23 may be constructed as a separate piece from the shell of the reflector and joined thereto at 25.

Figs. 6 and 7 show a projector of the type previously described but designed to accommodate relatively large lamps and to bring the focus of reflection relatively close to the lamps and the camera lens. In these figures, 31 designates the reflector; 32 the lamps; 33 the central tubular protuberance of the reflector shell; 34 the flaring or expanding extension thereof which provides the front light shield and which carries the lamps. As shown in Fig. 6, the shanks of the lamps or light bulbs extend through openings in the light shield and are screwed into lamp sockets 35 of Bakelite or other suitable insulating material which are mounted in socket housings 36 attached to the front of the light shield. The lamp-carrying front light shield member 34 is formed as a separable center piece interfitted with the tubular protuberance 33 at 37, permitting ready removal of the center piece for replacement of lamps. In this instance the center piece is formed with a vision tube 38 projecting rearwardly through the central tubular protuberance 33 of the reflector shell. Electric wiring connecting the lamps in parallel is indicated at 39, such wiring being insulated in asbestos. This showing of the electric connections is only exemplary, it being understood that to suit different requirement and conditions the lamps may be connected in parallel or in series, and to the same supply circuit or different circuits. Where batteries of very high power lamps, such as the No. 2 light bulbs aforesaid, are employed, it may be necessary to connect groups of lamps to different supply circuits, since the connection of more than two of such lamps to an ordinary 110 volt room lighting circuit may impose too great a load upon such circuit. It is within the province of skill in the electrical art to provide appropriate circuit connections to suit particular requirements, which connections may include a convenient foot-operated duplex switch by which different groups of lamps may be simultaneously connected with their different supply circuits. For simplicity I illustrate the lamps in Fig. 6 connected in parallel in a manner for connection with a single supply circuit. The insulated electric wires 39 are connected with such circuit through an insulated electric light cord 40 having a plug 41 to be plugged into a socket (not shown) for connection with the source of supply current. This cord may extend through the vision tube as shown, or it may be passed through suitable apertures therefor in the central lamp housing portion of the reflector, or may be otherwise suitably arranged.

For flash-light photography, embodiments of the invention such as shown in Figs. 1 and 6, or various other forms hereinafter referred to, may be equipped with photo-flash bulbs, in which case the circuit for the bulbs will include a normally open switch or circuit breaker to be closed for igniting the bulbs. Cameras in combination with photo-flash bulbs wherein the circuit for the bulbs is closed simultaneously or synchronously with the exposure of the sensitive film of the camera by means operable in conjunction with the operation of the shutter, are known to the camera art.

It will be observed in Fig. 6 that the hyper-ellipsoidal reflector embodies segments of relatively short squat ellipses indicated in dotted lines at 42 and 43. The major axes of such imaginary ellipses are indicated at 44 and 45. Said ellipses have their rearward foci on an imaginary circle on which the lamps are positioned, and their front foci at or approximately at the focus 46 of reflection of light rays 47.

Assuming Fig. 6 to represent, for example, a projector equipped with the No. 2 Mazda photo flood light bulbs, which are about three inches in diameter, it will be observed that the axial length of the reflector is only about 9½ inches, while the distance from the rear end of the reflector to the focus 46 is only about twenty-one inches, giving enormous object illumination from high power lamps relatively close to the object, and permitting photography of such object at a relatively close range; though projectors of the character shown in Fig. 6 may be designed with a relatively larger vision opening to permit setting the camera further back for photography at such various greater ranges as may be desired. Although five or six of the No. 2 light bulbs could be accommodated in this particular reflector, I show only four, and contemplate using only three in some cases, since for many purposes a greater number than three or four of these high power lamps would give a greater light power than would be desirable. On the other hand I contemplate using in the same reflector from six to eight of the smaller No. 1 light bulbs, which are only about 2⅜ inches in diameter, thus obtaining from such greater number of smaller lamps about as much illumination as with three or four of the large bulbs, while gaining the advantage of convergence of reflected light, as indicated at 47, from a greater number of sources of light around the axis of the reflector.

Embodiments of the invention such as illustrated in Fig. 6 are highly useful for many purposes, producing relatively close to the lamps and vision opening a field of light with a brilliant center and surrounding diminishing light. This would be exceedingly useful, for example, in making photographs for advertising purposes of groups of articles where it is desired to accentuate by higher illumination the article or articles in the center of the group. The field of illumination produced is generally useful for many photographic purposes including photography of small objects, which may be placed at or near the focus 46, either fore or aft. By locating the mouth or opening of a cavity at or near the focus 46, the cavity would be interiorly illuminated.

Figs. 8 and 9 represent an embodiment of the invention comprising a reflector 51 and lamps or light bulbs 52. The general construction is similar to that previously described. In this case, however, the hyper-ellipsoidal reflecting surface 53 embodies segments of imaginary ellipses 50 having their rearward foci on the imaginary circle on which the lamps are positioned and their forward foci spaced apart but nearer to the axis of the reflector than the rearward foci, the major axes 50ᵃ and 50ᵇ of such ellipses intersecting beyond their forward foci. Thus in the diametric plane of the drawings, Fig. 8, the contour line from 54 to 55 is a segment of an ellipse having its foci at 56 and 57; and the corresponding contour line from 58 to 59 on the opposite side of the reflector axis is a segment of an ellipse having its foci at 60 and 61; the major axes of these ellipses crossing in this instances at a point (not shown) considerably beyond the forward foci 57 and 61. Thus the reflector in its various radial planes embodies segments of ellipses whose forwardly situated foci, represented by the points 57 and 61, are on an imaginary ring of nodes or intersections of reflected light rays 62. This results in a conversion of the conical shaft of reflected rays 62 into a slender forwardly extending shaft of crossed light, which can be easily directed into an anatomical cavity such for instance as the mouth cavity 63 of a patient for illumination of a part therein, e. g. the throat tonsil 64. The crossed light rays beyond the ring of nodes or light ray intersections 57, 61 will produce a restricted field of dense illumination beyond the point 65, the best objective area of this field being that at which the tonsil 63 is shown located. While a special advantage of the projector of Fig. 8 is thus indicated, it should be remembered that such an embodiment of the invention is useful for many purposes in connection with photographic object illumination, producing a field of central high brilliancy and surrounding halo of lesser light.

A projector such as shown in Fig. 8, designed to accommodate light bulbs of a given size, may be designed to bring the area of condensed illumination relatively closer to the vision opening of the projector than in the case of the projector of Fig. 1 designed to accommodate lamps of the same size. Assuming Fig. 8 to represent, for example, a projector equipped with the No. 1 light bulbs, the axial length of the particular reflector shown would be about fifteen inches, and the distance of the object 64 from the vertical center of the annulus of lamps would be about thirty-seven inches; it being understood of course that these figures are merely exemplary of the particular design shown, and that projectors embodying this form of the invention may, as in the case of other forms, be constructed in numerous specific designs and proportions.

There is shown in Fig. 8 the objective tube or lens tube 66 of a camera 67, the camera in this instance being equipped with a telephoto lens or objective which embodies a Goerz reflex focuser 68. Camera objectives of this type embodying the Goerz reflex focuser, and the advantages thereof, are well understood in the camera art.

Fig. 10 shows an embodiment of the invention comprising a reflector 71 and lamps 72. The construction of the reflector 71 with respect to its central lamp housing portion is similar to that described with reference to Fig. 5. In Fig. 10 however the imaginary ellipses 70 whose segments are embodied in the hyper-ellipsoidal reflector are arranged with their major axes crossing between their foci, so as to locate the forward foci of such ellipses on the opposite side of the reflector axes from their rearward foci. Thus diametrically opposite contour lines of the reflector embody segments of imaginary ellipses whose rearward foci are at the centers of lamps 72 and whose major axes 70ᵃ and 70ᵇ cross at the points 73, locating the forward foci of such ellipses at points not shown beyond the objective area 74. With this arrangement light indicated by the rays 75 reflected in radial planes from the different lamps is superimposed upon the objective area 74. A field of dense concentrated light is provided in the double cone-shaped space indicated in the drawings by the light rays connecting the points 73, 76, 77, 78, 79. This construction also is highly advantageous for illumination of small objects for photography, including parts within anatomical cavities, and for more general photographic object illuminating purposes, the restricted field of concentrated light between 73 and 77 being surrounded by a halo of lesser light, and the whole surrounded by a field of diminishing light.

Fig. 11 shows an annular lamp for use in projectors embodying the invention. This is an incandescent electric lamp. The light bulb 252 is in the form of an annulus. The luminous element or filament is indicated at 253. The shank 254 of the annular bulb extends through an opening in the light reflector 251, and a lamp socket 255 having suitable electrical connections with the bulb is screwed on to the shank. The bulb is positioned in the light reflector by a positioning member 256 of suitable insulating material.

Fig. 12 shows a projector for producing a field of concentrated light of relatively large area relatively close to the projector. In this figure the shell of the reflector is designated by the numeral 301 and the lamps by the numeral 302. The contour of the reflector is such that the intersection of a diametric plane therewith defines segments of imaginary ellipses 304 and 305 which in this instance are identical with the long ellipses shown in Fig. 1 but are arranged with their major axes 306 and 307 intersecting in front of the lamps within the shell of the reflector. Light reflected from the lamps in the planes of the ellipses, as indicated by the reflected rays 308, crosses just in front of the reflector, forming the double cone of concentrated light represented in the drawings by the lines connecting the points 309, 310, 311, 312. This provides a field of illumination in which relatively large objects such as human heads and the like can be photographed at close range. All of the reflected light from the several lamps represented by the rays 308 is superimposed upon an objective area such as 313. Assuming Fig. 12 to represent a construction employing the large No. 2 light bulbs, the axial length of the reflector is about eighteen inches, while the objective area 313 is about thirty inches from the rear end of the shaft. At 314 is indicated an objective area having a central portion of brilliant illumination and a surrounding portion of high though less brilliant illumination, the latter surrounded by a field of diminishing light.

Fig. 13 shows a construction in which diametrically opposite contour lines of the reflector 401 embody segments of imaginary ellipses 403 and 404 which are similar in proportion to the ellipses shown in Fig. 6, but in Fig. 13 the imaginary circle of rearward foci of said ellipses, on which the lamps 402 are positioned, is of greater diameter, and the major axes 405 and 406 of said ellipses are at very slight inclinations to the axis of the reflector and cross or intersect considerably beyond the forward foci 408 and 409 of the ellipses. This produces beyond the reflector a field of concentration of reflected light rays 410 in the double-cone space bounded by the lines connecting the points 411, 412, 407, 413. All light reflected in the manner represented by the light rays 410 is superimposed upon the objective area 414. An objective area such as 415 is brilliantly illuminated at the center, with a surrounding less brilliant illumination.

Fig. 14 shows a projector which differs from those previously described in that the light reflecting surface of the hyper-ellipsoidal reflector 501 is an external surface arranged within or surrounded by the annular series of lamps 502, the major axes 503 and 504 of the imaginary ellipses 505 and 506 whose segments are embodied in diametrically opposite contour lines of the reflector being arranged convergently around the reflector and the body of projected reflected light represented by the rays 507. The forward foci of such ellipses in this instance are coincident or approximately coincident at the focus of reflection 508. The reflector in this construction is formed at its outer circumferential portion to provide a lamp housing 509. The reflector has a central vision opening, and may be formed with a short tubular protuberance 510 to prevent any possible reflection of light in a direction toward a lens of the camera 511 behind the reflector. If desired the reflector may be constructed with a front conical light shield 512 surrounding the body of reflected light. The camera 511 is shown mounted on a carriage 513 slidable on rods 514 projecting from the head 515 of the camera tripod, while the reflector 501 is attached to said rods by the bracket connection 516.

Fig. 15 shows a projector of the character hereinbefore described embodied in a distinctive instrument for microscopic examination of body tissues and other objects, or for other purposes. The shell of the hyper-ellipsoidal light reflector 601 is determined by a squat ellipse. In the diametric plane of the drawings, the opposite contour lines of the reflector embody segments of ellipses 603 and 604 having foci at 605 and 606 at the centers of lamps 602 and coincident foci at the focus 607 of reflected light. Incident light rays are indicated at 608, and reflected light rays by 609. An object support is provided at 610 on a vertically adjustable rod 611 mounted in a stand or holder 612. A compound microscope 613 is shown inserted through the vision opening of the reflector, for obtaining a magnified view of the object or material supported on the support 610. The object examined in this instance is illuminated by light coming from around and partly from portions of the reflector below the object. This distinctive manner of illumination would be useful for many purposes other than microscopic examination, as for instance the photographing of gems and pieces of cutglass where it is desired to produce beautiful illuminating effects. The lamp housing portion of the reflector in Fig. 15 includes the light shield 614. Projectors of this type for photographic object illumination may be designed with larger central vision openings than that shown for accommodation of the microscope 613.

In the following claims, unless a contrary intention appears from the contents, the expression "sources of light" will be understood to include either a plurality of individual lamps or a single annular lamp, the latter being considered as providing sources of light at many points around its axis.

I claim as my invention:

1. A light projector comprising an annular shell through which an optical field may extend from an eye or lens behind the projector, said shell having an annular light reflecting surface of a hyper-ellipsoidal type which is substantially that described by the revolution about the axis of said shell of a curve adapted to reflect forwardly and convergingly toward the axis a multiplicity of light rays incident thereon in the plane of the curve from a source in a given position relative thereto, light source means arranged to provide sources of light around said axis on an annular locus of such position, and housing means cooperating with the shell to partially enclose said light source means while permitting light therefrom to impinge on said surface, said housing means including an interiorly toric light reflecting surface which reflects to said first mentioned surface multiples of light rays emitted from said sources in directions other than towards said first mentioned surface, said sources of light being at centers of semicircles defined by intersections of radial planes with said toric surface, and said toric surface extending in front of said light source means and preventing passage from the projector of light rays parallel with said axis.

2. A light projector comprising an annular shell having a central annular lamp housing portion, sources of light arranged around the axis of the shell within said lamp housing portion, said lamp housing portion comprising an annular wall of parti-circular form surrounded by said sources, a part of said wall extending behind said sources, another part of said wall extending in front of said sources, forming an annular light shield whose margin or extremity is surrounded by and spaced from the shell, said surrounding part of the shell extending from said part of said wall behind said sources and surrounding the latter, the shell and lamp housing portion being interiorly light reflecting, that portion of the shell from which reflected light is projected beyond the shell being formed to reflect such light toward the axis, said last mentioned portion of the shell having a hyper-ellipsoidal light reflecting surface which is substantially that generated by revolution about said axis of the shell of a segment of an ellipse whose rear focus travels in a circular locus and whose major axis is oblique to and intersects said first mentioned axis forwardly of said locus, said sources of light being centered on said locus and at centers of semi-circles defined by intersections of radial planes with said parti-circular wall of said lamp housing portion, and the shell and lamp housing portion intercepting all direct light.

3. A light projector comprising an annular structure including a lamp housing portion and a light reflecting portion, one surrounding the other, and sources of light arranged around the axis of said structure within said lamp housing portion, a terminal of said lamp housing portion being spaced from said reflecting portion, thereby providing an annular opening through which said reflecting portion is exposed to light from the several sources, said reflecting portion having a hyper-ellipsoidal light reflecting surface to reflect forwardly and convergingly light from said sources incident in radial planes, said hyper-ellipsoidal surface being substantially that generated by revolution about said axis of a segment of an ellipse whose rear focus travels in a circular locus and whose major axis is oblique to and intersects said first mentioned axis forwardly of said locus, said sources of light being centered on said locus, the structure affording an optical passage therethrough and adapted to intercept substantially all direct light other than that which projects forwardly in direction diverging outward from lines parallel with the axis of the reflector, said lamp housing portion having an interiorly toric light reflecting surface and said sources of light being at centers of semicircles defined by intersections of radial planes with said toric surface.

4. A light projector comprising an annular structure having a central vision opening and a surrounding outwardly facing channel of semicircular cross-section, sources of light mounted in said channel at spaced intervals thereround and approximately at the center of said channel, the interior surface of said channel being light-reflecting, and an annular wall extending from the back wall of said channel outwardly and forwardly, said last-mentioned wall having an interior hyper-ellipsoidal light reflecting surface exposed to direct light from said sources and to light reflected thereto from the interior surface of said channel, said hyper-ellipsoidal surface being substantially that generated by revolution about said axis of a segment of an ellipse whose rear focus travels in a circular locus and whose major axis is obuique to and intersects said first mentioned axis forwardly of said locus, said sources of light being centered on said locus.

JOSEPH F. JAROS.